US005699087A

United States Patent [19]

Krenik et al.

[11] Patent Number: 5,699,087

[45] Date of Patent: Dec. 16, 1997

[54] SEQUENTIAL ACCESS MEMORIES, SYSTEMS AND METHODS

[75] Inventors: William R. Krenik, Garland; Louis J. Izzi, Plano, both of Tex.

[73] Assignee: Texas Instruments, Dallas, Tex.

[21] Appl. No.: 333,899

[22] Filed: Nov. 3, 1994

Related U.S. Application Data

[63] Continuation of Ser. No. 223,380, Apr. 5, 1994, abandoned, which is a continuation of Ser. No. 720,100, Jun. 24, 1991, abandoned.

[51] Int. Cl.[6] .............................. G09G 5/06; G06F 12/00

[52] U.S. Cl. .......................... 345/199; 345/200; 395/401; 395/515

[58] Field of Search .................................... 340/703, 799, 340/798; 345/186, 199, 200, 189, 190, 185, 188; 395/164, 427, 401, 509, 515; 364/230.01, 230.08, 233, 236

[56] References Cited

U.S. PATENT DOCUMENTS

| | | | |
|---|---|---|---|
| 4,330,852 | 5/1982 | Redwine et al. . | |
| 4,562,435 | 12/1985 | McDonough et al. . | |
| 4,636,986 | 1/1987 | Pinkham . | |
| 4,639,890 | 1/1987 | Heilveil et al. . | |
| 4,644,495 | 2/1987 | Crane | 340/799 |
| 4,683,555 | 7/1987 | Pinkham . | |
| 4,685,089 | 8/1987 | Patel et al. . | |
| 4,689,807 | 8/1987 | Maan . | |
| 4,720,819 | 1/1988 | Pinkham et al. . | |
| 4,768,157 | 8/1988 | Chauvel et al. . | |
| 4,769,632 | 9/1988 | Works et al. | 340/701 |
| 4,799,053 | 1/1989 | Van Aken et al. . | |
| 4,799,146 | 1/1989 | Chauvel . | |
| 4,807,189 | 2/1989 | Pinkham et al. . | |
| 4,815,033 | 3/1989 | Harris | 364/900 |
| 4,817,054 | 3/1989 | Banerjee et al. | 340/799 |
| 4,818,979 | 4/1989 | Manson . | |
| 4,823,120 | 4/1989 | Thompson et al. . | |
| 4,825,390 | 4/1989 | Van Aken et al. . | |
| 4,827,249 | 5/1989 | Chauvel et al. . | |
| 4,829,475 | 5/1989 | Ward et al. . | |
| 4,868,548 | 9/1989 | Gelvin . | |
| 4,905,189 | 2/1990 | Brunolli . | |
| 5,089,811 | 2/1992 | Leach . | |

OTHER PUBLICATIONS

Mano, M. Morris, *Digital Design* (1984) pp. 257–258 Prentice–Hall, Inc.

Brooktree, "BT459", *Product Data Book 1989,* 1989, pp. 5-85–5-115.

Texas Insturments Incorporated, "TMS34070–20 Color PaLette" *Production Data,* 1986 pp. 1–15.

Brooktree, "RAMDAC Products" *Winter 1990 Product Selection Guide,* Winter, 1990 pp. 9–15.

Analog Devices CMOS 80 MHz Monolithic 256 x 24(18) Color Palette RAM–DAC.

INMOS IMS G300 Colour Video Controller Nov. 1988 pp 73–75, 85, 93–95.

INMOS The Graphics Databook First Edition 1988 pp. 6–8.

INMOS IMS G171 High performance CMOS Colour look–up table Nov. 1988 pp. 9, 31, 53–59.

*Primary Examiner*—Richard Hjerpe
*Assistant Examiner*—Kara Farnandez Stoll
*Attorney, Agent, or Firm*—Gerald E. Laws; C. Alan McClure; Richard L. Donaldson

[57] ABSTRACT

A method is provided for accessing data stored in memory (76). First data appearing at outputs (102) of memory (76) are read during a first reading cycle in a sequence of reading cycles, the first data retrieved from a first location in memory (76) corresponding to a first address. At the end of the first reading cycle, the first address is stepped to produce a second address corresponding to a second location in memory (76). During an idle period following the first reading cycle and prior to a second reading cycle occurring next in the sequence of reading cycles, second data is prefetched from the second location in memory (76) such that the second data appears at the bitlines (102) of memory (76) at the start of the second reading cycle.

28 Claims, 3 Drawing Sheets

SEQUENTIAL ACCESS MEMORIES, SYSTEMS AND METHODS

This application is a continuation of application Ser. No. 08/223,380, filed Apr. 5, 1994 abandoned which is a continuation of application Ser. No. 07/720,100 filed Jun. 24, 1991 is now abandoned.

TECHNICAL FIELD OF THE INVENTION

The present invention relates in general to memories and in particular, to sequential access memories, systems and methods.

NOTICE (C) Copyright, Texas Instruments Incorporated, 1990. A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

CROSS-REFERENCE TO RELATED APPLICATIONS

The following U.S. Patent, assigned to Texas Instruments Incorporated, the assignee of the present application, is cross-referenced and incorporated into the present application by reference.

| Serial No. | Title |
|---|---|
| U.S. Pat. No. 5,327,159 | PACKED BUS SELECTION OF MULTIPLE PIXEL DEPTHS IN PALETTE DEVICES, SYSTEM AND METHODS |

BACKGROUND OF THE INVENTION

Without limiting the general scope of the invention, its background is described in connection with computer graphics, as an example only.

In computer graphics systems, the low cost of dynamic random access memories (DRAM) has made it economical to provide a bit map or pixel map system memory. In such a bit map or pixel map memory, a color code is stored in a memory location corresponding to each pixel to be displayed. A video system is provided which recalls the color codes for each pixel and generates a raster scan video signal corresponding to the recalled color codes. Thus, the data stored in the memory determine the display by determining the color generated for each pixel (picture element) making up that display.

The requirement for a natural looking display and the minimization of required memory are conflicting. In order to have a natural looking display, it is necessary to have a large number of available colors. This, in turn, necessitates a large number of bits for each pixel in order to specify the particular color desired from among a large number of possibilities. The provision of a large number of bits per pixel, however, requires a large amount of memory for storage. Since a number of bits must be provided for each pixel in the display, even a modest size display would require a large memory. Thus, it is advantageous to provide some method of reducing the amount of memory needed to store the display while retaining the capability of choosing among a large number of colors.

The provision of a circuit called a color palette provides for a compromise between these conflicting requirements. The color palette stores color data words which specify colors to be displayed in a form that is ready for digital-to-analog conversion directly from the color palette. Color codes are stored in the bit map memory for each pixel having a limited number of bits, thereby reducing the memory requirements. The color codes are employed to select one of a number of color registers or palette locations. These color registers or palette locations each store color data words which are longer than the color codes in the pixel map memory. The number of such color registers or palette locations provided in the color palette is equal to the number of selections provided by the color codes. For example, a four bit color code can be used to select 24 or 16 palette locations. The color data words can be redefined in the palette from frame-to-frame to provide many more colors in an ongoing sequence of frames than are present in any one frame.

For optimum system operation, quick access of the color data words from the color palette is required such that the color data words can be redefined from frame to frame. Currently available methods and circuits for accessing data stored in memory suffer from the disadvantage of lag time between the need for the stored data and the availability of the data at the memory outputs. In particular, in currently available systems, an enable signal is supplied to the memory chip followed by a period in which the chip memory awaits for an address such that the desired stored data can be output. Once the address is made available, the memory output lines are charged. For high speed systems, delay between the arrival of the address and the availability of the data can prove to be a substantial impediment to optimum performance.

Due to the advantages of color palette devices, systems and methods, any improvement in their implementation is advantageous in computer graphics technology. In particular, a need has arisen for circuitry, methods and systems which reduce the time required to access data stored in palette memory.

SUMMARY OF THE INVENTION

Methods and apparatus are provided for accessing data stored in a memory. First data appearing at the outputs of the memory are read during a first reading cycle in a sequence of reading cycles, the first data being retrieved from a first location in the memory corresponding to a first address. At the end of the first reading cycle, the first address is stepped to produce a second address corresponding to a second location in the memory. During an idle period following the first reading cycle and prior to a second reading cycle occurring next in the sequence of reading cycles, second data are prefetched from the second location in the memory such that the second data appear at the outputs of the memory at the commencement of the second reading cycle.

The illustrated embodiments of the present invention provide the significant technical advantage of reducing the time required to access data stored in a memory. In particular, in the illustrated embodiments, data are brought to the output to the memory during the idle time between read cycle such that when the next read cycle is initiated, those data are already available for sensing. In the illustrated embodiments therefore, there is no need to wait until the start of the next read cycle prior to initiating an access sequence to bring the data to the memory outputs.

BRIEF DESCRIPTION OF THE DRAWINGS

For a more complete understanding of the illustrated embodiments of the present invention, and the advantages thereof, reference is now made to the following descriptions taken in conjunction with the accompanying drawings, in which.

DETAILED DESCRIPTION OF ILLUSTRATED EMBODIMENTS

Figures 1, 2, 5:
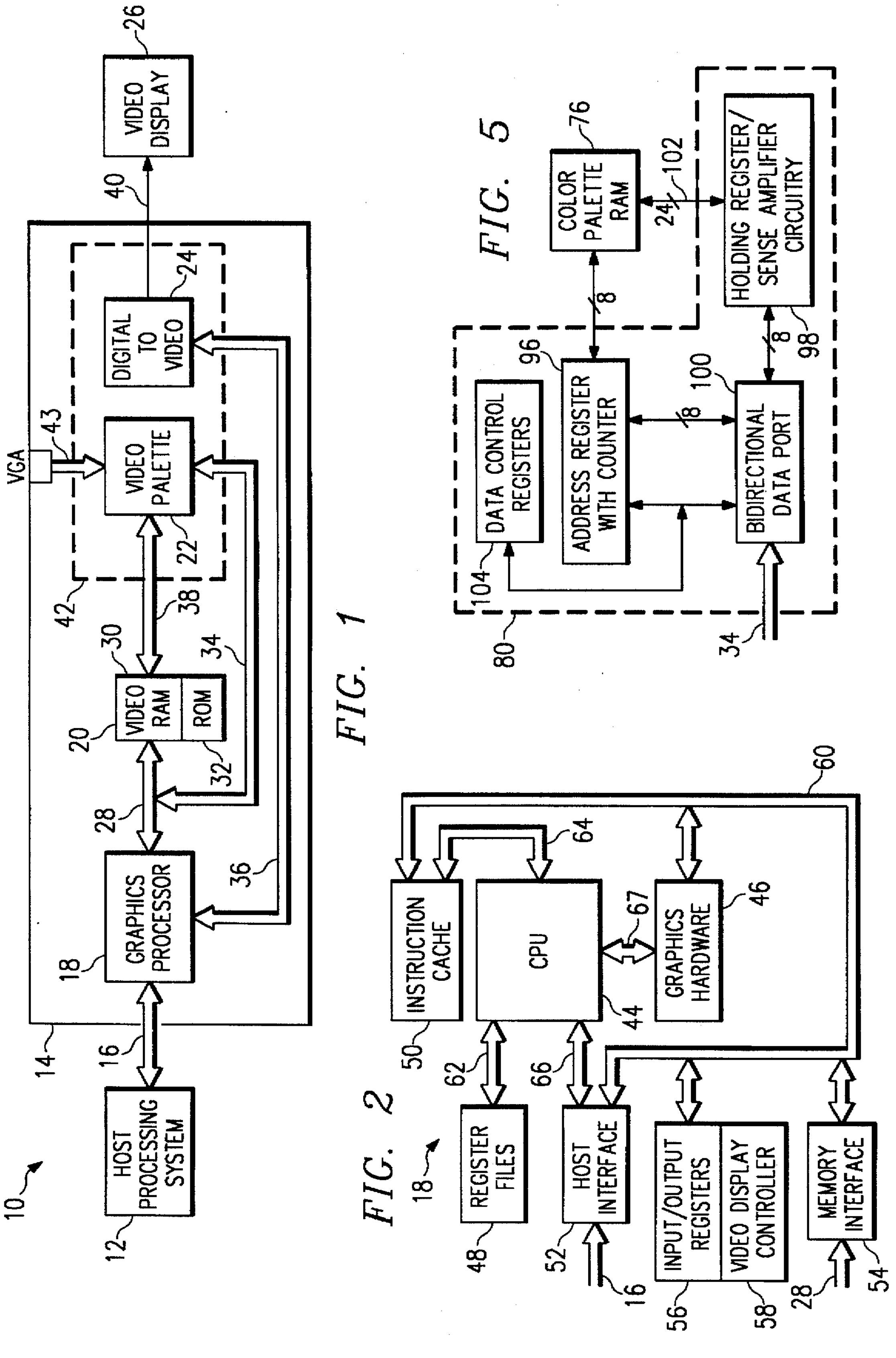
FIG. 1 is a functional block diagram of a graphics processor system utilizing one embodiment of the present invention.
FIG. 2 is a functional block diagram of a graphics processor for use with the invention.
FIG. 5 is a more detailed functional block diagram of portions of the video palette of FIG. 4, emphasizing the color palette RAM associated circuitry for reading and writing into data locations therein.

Referring first to FIG. 1, a block diagram of a graphics computer system 10 is depicted as constructed in accordance with the principles of the illustrated embodiment of the present invention. For clarity and brevity in understanding the inventive concepts herein, a detailed description of the complete graphics processing system will not be provided. A more complete detailed discussion, however, can be found in U.S. Pat. No. 5,327,159, assigned to the assignee of the present application and hereby incorporated by reference. Also incorporated by reference herein are Texas Instruments TMS 34010 User's Guide (August 1988); TIGA-340 (TM) Interface, Texas Instruments Graphics Architecture, User's Guide, 1989, TMS 34020 User's Guide (January 1990), and TMS 44C251 Specification, all of which documents are currently available to the general public from Texas Instruments Incorporated. These documents give a more thorough description of graphics processing systems in general.

Graphics computer system 10 includes a host processing system 12 coupled to a graphics printed wiring board 14 through a bidirectional bus 16. Located on printed wiring board 14 are a graphics processor 18, memory 20, a video palette 22 and a digital-to-video converter 24. Video display 26 is driven by graphics board 14.

Host processing system 12 provides the major computational capacity for graphics computer system 10 and determines the content of the visual display to be presented to the user on video display 26. The details of the construction of host processing system 12 are conventional in nature and known in the art and therefore will not be discussed in further detail herein.

Graphics processor 18 provides the data manipulation capability required to generate the particular video display presented to the user. Graphics processor 18 is bidirectionally coupled to processing system 12 via bus 16. While graphics processor 18 operates as a data processor independent of host processing system 12, graphics processor 18 is fully responsive to requests output from host processing 12. Graphics processor 18 further communicates with memory 20 via video memory bus 28. Graphics processor 12 controls the data stored within video RAM 30, RAM 30 forming a portion of memory 20. In addition, graphics processor 18 may be controlled by programs stored in either video RAM 30 or in read-only memory 32. Read-only memory 32 may also include various types of graphic image data, such as alpha numeric characters in one or more font styles and frequently used icons. Further, graphics processor 12 controls data stored within video palette 22 via bidirectional bus 34. Finally, graphics processor 18 controls digital-to-video converter 24 via video control bus 36.

Video RAM 30 contains bit map graphic data which controls the video image presented to the user as manipulated by graphics processor 18. In addition, video data corresponding to the current display screen are output from video RAM 30 on bus 38 to video palette 22. Video RAM 20 may consist of a bank of several separate random access memory integrated circuits, the output of each circuit typically being only one or four bits wide as coupled to bus 38.

Video palette 22 receives high speed video data from video random access memory 30 via bus 38 and data from graphics processor 18 via bus 34. In turn, video palette 22 converts the data received on bus 38 into a video level which is output on bus 40. This conversion is achieved by means of a look-up table which is specified by graphics processor 18 via video memory bus 34. The output of video palette 22 may comprise color, hue and saturation signals for each picture element or may comprise red, green and blue primary color levels for each pixel. Digital-to-video converter 24 converts the digital output of video palette 22 into the necessary analog levels for application to video display 26 via bus 40.

Video palette 22 and digital-to-video converter 24 may be integrated together to form a "programmable palette" 42 or simply "palette" 42.

Video display 26 receives the video output from digital-to-video converter 24 and generates the specified video image for viewing by the user of graphics computer system 10. Significantly, video palette 22, digital-to-video converter 24 and video display 26 may operate in accordance with either of a two major video techniques. In the first technique, video data are specified in terms of color, hue and saturation for each individual pixel. In the second technique, the individual primary color levels of red, blue and green are specified for each individual pixel. Upon selection of the desired design using either of these two techniques, video palette 22, digital-to-video converter 24 and video display 26 are customized to implement the selected technique. However, the principles of the present invention in regard to the operation of the graphics processor 18 are unchanged regardless of the particular design choice of the video technique. All of the signals that contribute to display color in some way are regarded as color signals even though they may specifically define the individual red, blue and green color levels.

FIG. 2 illustrates graphics processor 18 in further detail. Graphics processor 18 includes a central processing unit 44, graphics hardware 46, register files 48, instruction cache 50, host interface 52, memory interface 54, input/output registers 56 and video display controller 58.

The central processing unit 44 performs a number of general purpose data processing functions including arithmetic and logic operations normally included in a general purpose central processing unit. In addition, central processing unit 44 controls a number of special purpose graphics instructions, either alone or in conjunction with graphics hardware 46.

Graphics processor 18 includes a major bus 60 which is connected to most parts of graphic processor 18, including central processing unit 44. Central processing unit 44 is bidirectionally coupled to a set of register files 48, including a number of data registers, via bidirectional register bus 62. Register files 48 serve as the repository of the immediately accessible data used by central processing unit 44.

Central processing unit 44 is also connected to instruction cache 50 by instruction cache bus 64. Instruction cache 50 is further coupled to bus 60 and may be loaded with instruction words from video memory 20 (FIG. 1) via video memory bus 28 and memory interface 54. The purpose of instruction cache 50 is to speed up the execution of certain functions of central processing unit 44. For example, a repetitive function that is often used within a particular portion of the program executed by central processing unit 44 may be stored within instruction cache 50. Access to instruction cache 50 via instruction cache bus 64 is much faster than access to video memory 20 and thus, the overall program executed by central processing unit 44 may be sped up by a preliminary loading of the repeated or often used sequences of instructions within instruction cache 50.

Host interface 52 is coupled to central processing unit 44 via host interface bus 66. Host interface 52 is further connected to host processing system 12 via host system bus 16. Host interface 52 serve to control the communications between host processing system 16 and graphics processor 18. Typically, host interface 52 would communicate graphics requests from the host processing system 16 to graphics processor 18, enabling host system 16 to specify the type of display to be generated by video display 26 and causing graphics processor 18 to perform a desired graphic function.

Central processing unit 44 is further coupled to graphics hardware 46 via graphics hardware bus 67. Graphics hardware 46 is additionally connected to major bus 60. Graphics hardware 46 operates in conjunction with central processing unit 44 to perform graphic processing operations. In particular, graphics hardware 46 under control of central processing 44 is operable to manipulate data within the bit map portion of video RAM 30.

Memory interface 54 is coupled to bus 60 and further coupled to video memory bus 28. Memory interface 54 serves to control the communication of data and instructions between graphics processor 18 and memory 20. Memory 20 includes both the bit map data to be displayed on video display 26 and the instructions and data necessary for the control and operation of graphics processor 18. These functions include control of the timing of memory access, and control of data and memory multiplexing.

Graphics processor 18 also includes input/output registers 56 and a video display controller 58. Input/output registers 56 are bidirectionally coupled to bus 60 to enable reading and writing within these registers. Input/output registers 56 are preferably within the ordinary memory space of central processing unit 44. Input/output registers 56 contain data which specify the control parameters of video display controller 58. In accordance with the data stored within the input/output registers 56, video display controller 58 controls the signals on video control bus 36 for the desired control of palette 42. For example, data within input/output registers 56 may include data for specifying the number of pixels per horizontal line, the horizontal synchronization and blanking intervals, the number of horizontal lines per frame and the vertical synchronization and blanking intervals.

Figure 3:
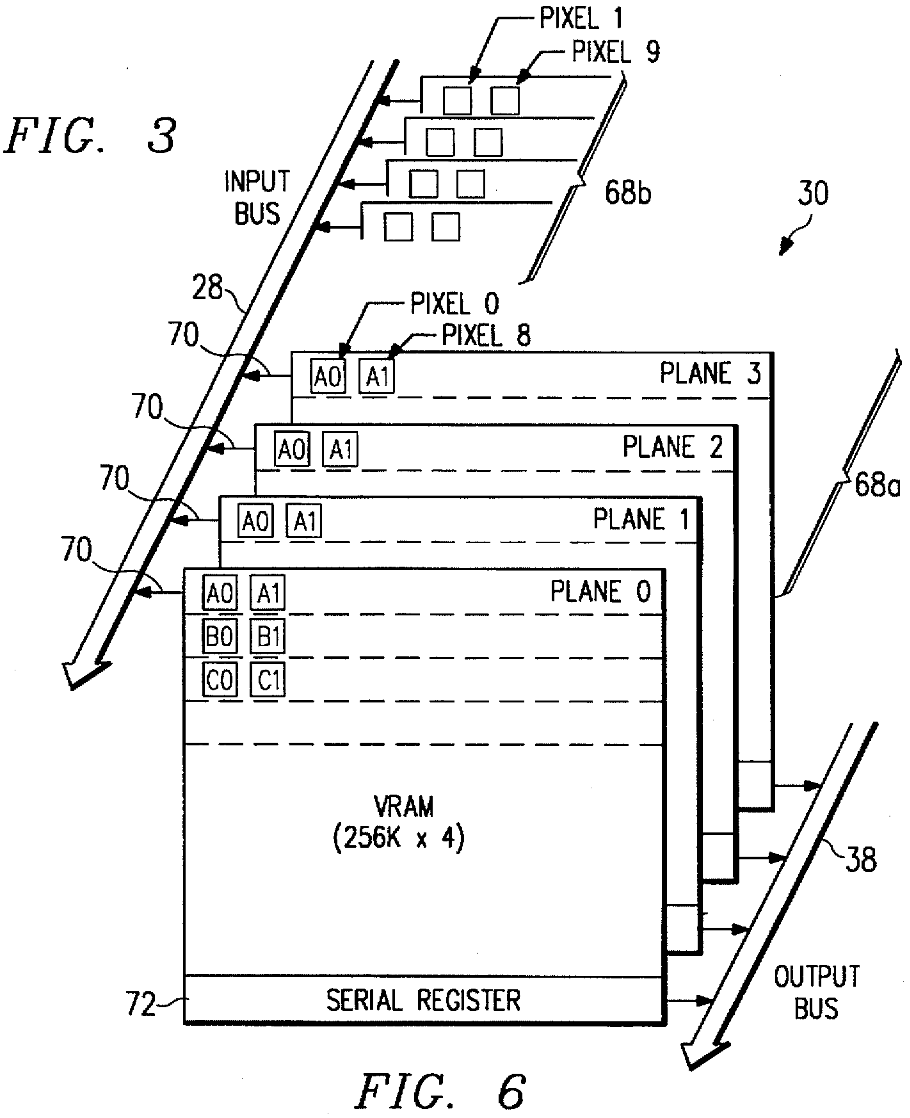
FIG. 3 depicts a preferred architecture for the video RAM depicted in FIG. 1.

Referring next to FIG. 3 a typical graphics memory system configuration for video RAM 30 is depicted in which eight VRAM memories 68 are used as an array, two of which are depicted as **68*a* and 68*b*. Each VRAM memory 68, or unit, includes four sections, or planes, 0, 1, 2 and 3. The construction of each plane is such that a single data lead 70 is used to write information to that plane. In a system which uses a 32-bit data bus, such as data bus 28, there would be eight VRAM memories, each VRAM memory having four data leads connected to the input data bus. For example, for 32-bit data bus 28, VRAM memory 68*a* would have its four data leads 70 connected to data bus 28 leads 0, 1, 2, and 3, respectively. Likewise, the next VRAM memory 68*b* would have its four leads 0, 1, 2, and 3 connected to data bus 28 leads 4, 5, 6, and 7, respectively. This pattern continues for the remaining six VRAMS such that the last VRAM has its leads connected to leads 28, 29, 30, 31 of bus 28**.

The VRAM memories 68 are arranged such that the pixel information for the graphics display is stored serially across the planes in the same row. Assuming a four-bit per pixel system, then the bits for each pixel are stored in separate VRAM memory. In such a situation, pixel 0 would be the first VRAM **68*a* and pixel 1 would be the second VRAM 68*b*. Pixel storage for pixels 2–7 would likewise be accomplished with the six remaining VRAM (not shown) coupled to input bus 28. The pixel information for pixel 8 would be stored in the first VRAM 68*a*, still in row A, but in column 2** thereof.

Each VRAM plane has a serial register 72 for shifting out information from a row of memory. In the illustrated embodiment, the shifting out is performed in response to a shift clock signal SCLK (not shown) generated on palette 42 (FIG. 1). The outputs from these registers are connected to bus 38 in the same manner as the data input leads are connected to input bus 28. Thus, data from a row memory, such as row A, would be moved into register 72 and output serially from each register 72 and in parallel on bus 38. This would occur for each plane of the eight VRAM memory array.

The memory configuration depicted in FIG. 3 is not limited to the handling of four bit pixel description data. For example, if the information for each pixel was to be described in eight bits, then two VRAMs 68 would be required per pixel. Further, for increased ability in handling data, shift registers 72 would be split in half with each half used to output data onto bus 38. The split register approach allows for differences in the number of pixels required by the display and the number of bits per pixel desired. A more complete description of this feature can be found in co-assigned U.S. Pat. No. 5,327,159 and hence, will not be repeated here.

Referring to FIGS. 1 and 2, graphics processor 18 operates in two different address modes to address memory 20. These two address modes are X-Y addressing and linear addressing. In linear addressing, the start of a field is formed by a single multibit linear address. The field size is determined by the data within a status register within central processing unit 44. In X-Y addressing, the start address is a pair of X and Y coordinate values. The field size is equal to the size of a pixel, that is, the number of bits required to specify the particular data of a particular pixel.

Figure 4:
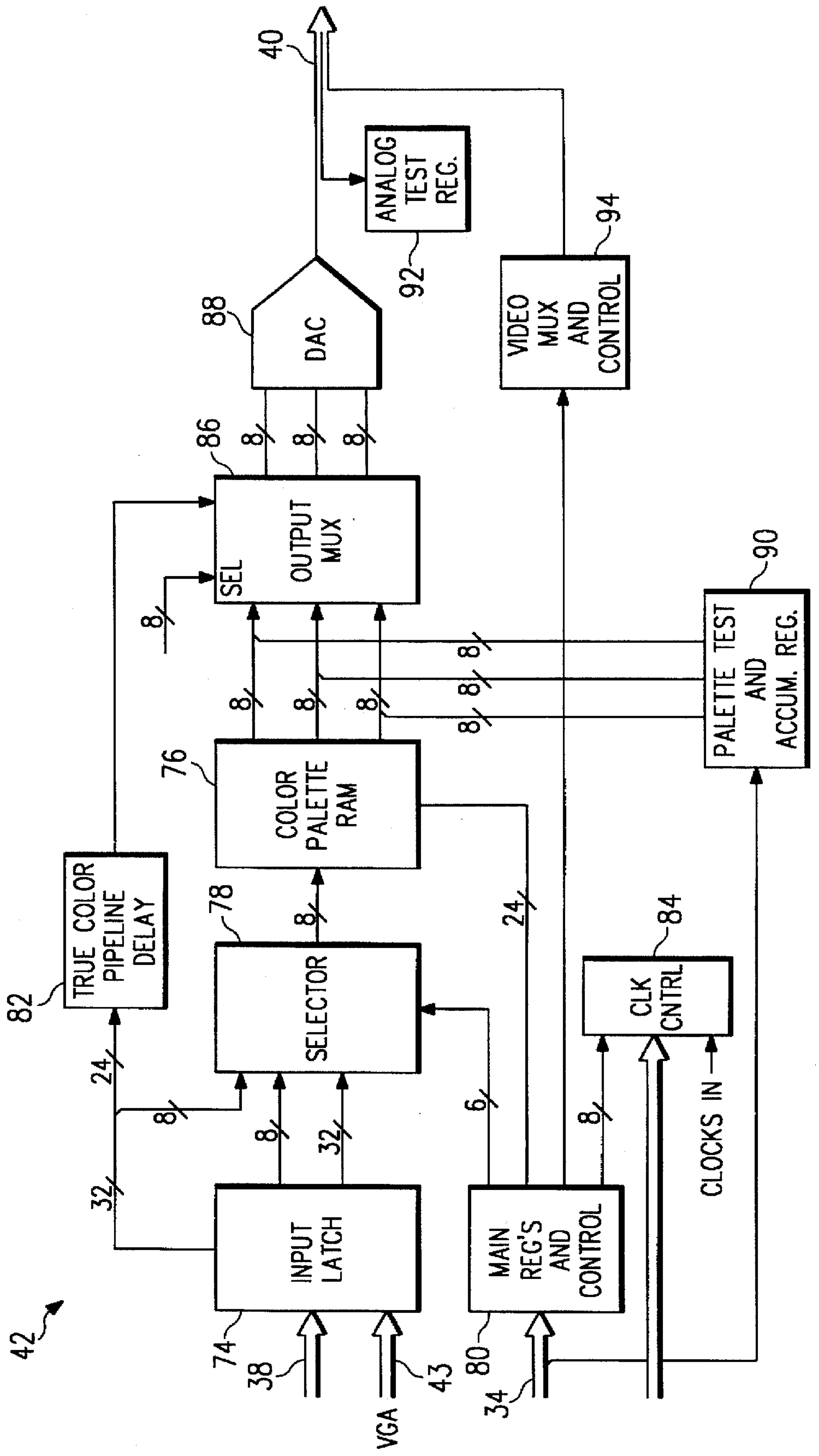
FIG. 4 is a functional block diagram of the video palette depicted in FIG. 1.

FIG. 4 is a more detailed depiction of palette 42 emphasizing the color palette RAM and the circuitry controlling it. Palette 42 includes an input latch 74 coupled to video memory 20 (all FIG. 1) via bus 38. In the illustrated embodiment, input latch 74 receives color codes output from eight VRAM memories 68 comprising video RAM memory 30. Color palette RAM 76 provides color data words in response to color codes received at input latch 74. Selector 78 couples color palette RAM 76 and input latch 74, in the illustrated embodiment receiving 32 bits of color code data from latch 74 and outputing 8-bit words of address data to color palette RAM 76.

In the depicted example, RAM 76 is of a 256×24 bit architecture with each 8-bit address outputing a 24-bit word. The 24-bits output can then provide three 8-bit words of red, blue or green, data to conversion and output by digital to analog converter 88. In the illustrated embodiment color palette RAM 76 is a high speed dual-port static RAM (SRAM), however color palette RAM 76 may also be implemented using dynamic random access memories (DRAMs).

Graphics processor 18 (FIG. 2) controls the contents of the color data words output to video display 26 in response to color codes received at latch 74 by the reading and writing of color data words into and out of color palette RAM 76 using registers and control circuitry 80 and bus 34. Preferably, the second port of a dual-port RAM is used for this data revision/update function. When a 256×24 bit memory is used, red, green and blue data are written in as a concatenated 24-bit word with an 8-bit address determining the memory location. Palette 42 also includes true color pipeline delay 82, clock control circuitry 84, output multiplexer 86 and digital-to-analog converters 88. Also depicted in FIG. 4 are palette test and accumulator registers 90, analog test registers 92, and video multiplexer and control circuitry 94. For a more complete description of these components, reference is made to U.S. Pat. No. 5,327,159 incorporated herein by reference.

FIG. 5 is a more detailed block diagram depicting the portions of registers and control circuitry 80 (represented in FIG. 5 by the dashed enclosure) which control the reading and writing of color data words into the desired locations in color palette RAM 76. To load color palette RAM 76, graphics processor 18 first writes to address register 96 (write mode) with the address where the modification is to start. This step is then followed by three successive writes to the palette holding register/sense amplifier circuitry 98 with eight bytes of red, green and blue data. After the blue (last) write cycle, the three bytes of color will be concatenated into a twenty-four bit word and then written into the RAM location specified by the address register 96. The address register 96 then increments to the next location, which graphics processor 18 may modify by simply writing another sequence of red, green, and blue data. A block of color values in consecutive locations may be written to by writing the start address and performing continuous red, green, and blue write cycles until the entire block has been written.

Reading from color palette RAM 76 is performed by writing to the address register 96 (read mode) the location to be read, which initiates a transfer of twenty-four bits from the palette RAM 76 into the holding register/sense amplifier circuitry 98, followed by an increment of the address register. Three successive reads from the holding register 98 will produce red, green, and blue color data (six or eight bits each depending on the desired operating mode) for the specific location. Following the blue read cycle (the last output of data), the contents of the color palette RAM 76 at the address specified by the address register 96 are copied into the holding register/sense amplifier circuitry 98 and address register 96 is again incremented. As with writing to the palette, a block of color values in consecutive locations may be read by writing the start address and performing continuous red, green, and blue read cycles until the entire block has been read.

Figure 6:
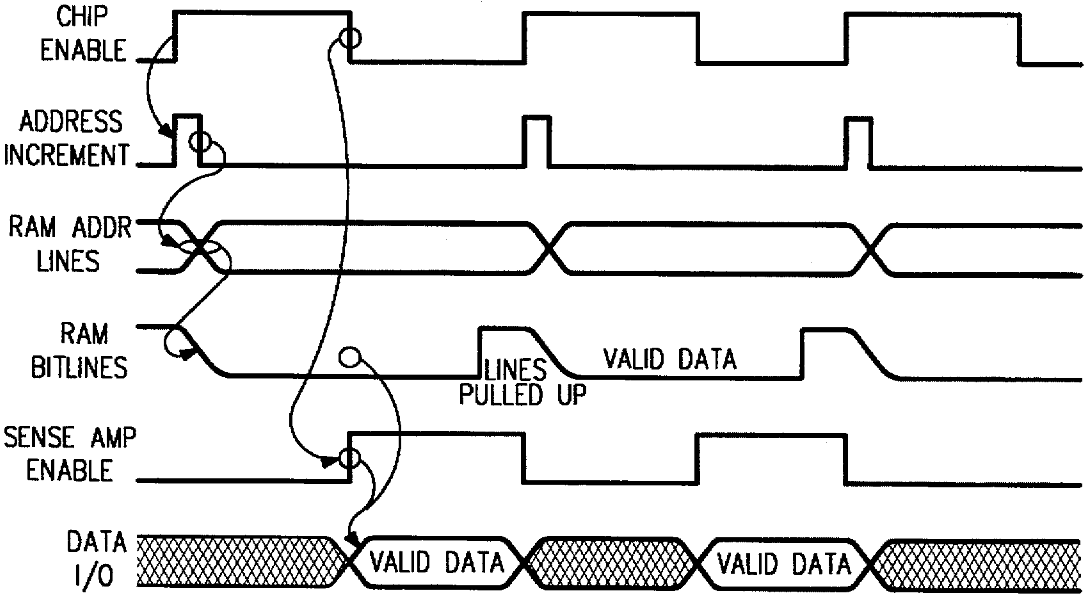
FIG. 6 is a timing diagram depicting the accessing of data from a memory according to one embodiment of the invention.

The operation of the illustrated embodiment of the present invention is most easily understood by referring to FIG. 5 in conjunction with FIG. 6 which depicts the read cycle timing of the circuitry of FIG. 5. With each rising edge of a chip enable signal received from graphics processor 18 through bidirectional data port 100 an address increment pulse is provided to address register 96. In the illustrated embodiment, the rising edge signals the end of the current read cycle. The address increment pulse increments the base address already set in address register 96, which includes a counter, by one increment. The bitlines 102 of RAM 76 are then charged during the idle time prior to the next read cycle such that the addressed data appears on bitlines 102 as well as the inputs of holding register/sense amplifier circuitry 98. On the following falling edge of the chip enable signal (the falling edge of the chip enable signal signaling the start of the next read cycle), a sense amplifier enable signal is provided to the sense amplifiers 98 such that the data already available on bitlines 102 can quickly be sensed and output through bidirectional data port 34 to graphics processor 18.

As depicted in FIG. 6, the address register is automatically incremented at the end of each read cycle. Following the incrementation, the address to RAM 76 is provided to release the bitline pre-charged circuitry thereby charging up bitlines 102 during the idle time before the next read cycle. The process of pre-charging the bitlines 102 of color palette RAM 76 to improve access time is not limited to the idle times between the read operations. For example, registers and control circuitry 80 also includes data control registers 104 which may be accessed separate and apart from address register 96. In the illustrated embodiment, when access to data control registers 104 is requested by graphics, processor 18 upon the receipt of the chip enable signal, the existing address in address register 96 is provided to color palette RAM 76 and the associated data for the addressed location is provided to holding register/sense amplifier circuitry 98. Thus, if on the next read cycle data are required by graphics processor 18, only providing a sense amplifier enable signal to holding register/sense amplifier circuitry 98 is necessary to access the data. Further, it is important to note that any given set of data provided to holding register/sense amplifier circuitry 98 by the pre-charging of the bitlines of color palette RAM during the idle periods may not be required by graphics processor 18. In such a case, a sense amplifier enable signal is not provided to holding register/sense amplifier circuitry 98 and on the next read or write cycle, the data in holding register/sense amplifier circuitry 98 simply replaced.

The present invention provides significant advantages over prior art methods of accessing random access memories. In particular, this timing allows a significant amount of time for the bitlines to charge such that a large signal is available for the sense amplifiers. Further, since the address increment and update takes place during idle time, lower speed circuitry can be implemented thereby saving power and area. Additionally, it should be noted that the signal polarities depicted in FIG. 6 are given as an example only and may be revised as required, as known in the art. Similarly, address register can be stepped in another way to reach the next required address. For example, address register 96 may be decremented or incremented/decremented in steps of varying magnitude.

While illustrated embodiments of the invention and their advantages have been set forth in the above-detailed description, the invention is not limited thereto, but only by the scope and spirit of the appended claims.

What is claimed is:

1. A method for accessing data stored in a memory, comprising the steps of:

latching first data at the outputs of the memory during a first reading cycle in a sequence of reading cycles, the first data retrieved from a first location in the memory corresponding to a first address;

stepping the first address after the first data is latched to produce a second address corresponding to a second location in the memory;

immediately prefetching second data from the second location in the memory in response to the step of stepping the first address such that the second data appear on the bitlines of the memory at the start of the second reading cycle;

activating sense amplifiers to sense the voltage on the bitlines; and latching the second data at the output of the memory during a second reading cycle occurring after the first reading cycle.

2. The method of claim 1, wherein said step of stepping the first address to produce a second address comprises the step of incrementing the first address.

3. The method of claim 1, wherein said step of stepping the first address to produce a second address comprises the step of decrementing the first address.

4. The method of claim 1, wherein said step of prefetching includes the substep of pulling up bitlines of the memory prior to the step of stepping the first address.

5. A method for accessing data in a memory, comprising the steps of:

providing an address signal to address a first location in the memory;

causing data stored in the first location to appear at a serial register associated with the memory during a time interval defined by a first chip enable signal, wherein the first chip enable signal is the first in a sequence of chip enable signals;

at the start of an idle time interval defined by the chip enable signal, stepping the address signal with an address stepping signal to address a second location in the memory; and immediately prefetching second data from the second location in the memory in response to the step of stepping the first address during a read time interval occurring between the first chip enable signal and a second chip enable signal occurring in the sequence after the first chip enable signal, thereby causing the data stored in the second location to appear on the bitlines of the memory in response to the step of stepping the address signal.

6. The method of claim 5, wherein the first and second enable signals comprise pulses, each pulse having a leading and trailing edge.

7. The method of claim 6, wherein the trailing edge of the first enable signal defines the end of the time interval.

8. The method of claim 7, wherein the leading edges comprise transitions from a high logic state to a low logic state and the trailing edges comprise transitions from a low logic state to a high logic state.

9. The method of claim 8, and further comprising the step of reading the first data during the time interval defined by the enable signal.

10. The method of claim 9, wherein said step of reading comprises the step of selectively activating sense amplifiers to detect voltages appearing on the outputs of the memory, the voltages corresponding to the first data.

11. A method for the high speed accessing of data stored in a memory, comprising the steps of:

storing a first address corresponding to a first location in the memory in an address register, wherein the address register includes a counter for stepping the first address to produce a second address corresponding to a second location in the memory;

outputting the first address stored in the address register to the memory and in response causing the memory bitlines to charge to voltages associated with the data stored in the first location;

making the voltages appearing on the charged memory bitlines available during a read time interval following a chip enable pulse having a leading edge and trailing edge, said pulse being one in a sequence of pulses;

applying a stepping signal to the counter to step the address stored in the address register, the stepping signal created in response to the leading edge of the next chip enable pulse;

causing the bitlines of said memory to charge to voltages associated with the data stored in the second data location immediately in response to stepping the address register; and activating sense amplifier circuitry coupled to the bitlines to sense the voltages on the bitlines during the read time interval.

12. The method of claim 11, wherein color data words are stored in the memory.

13. An improved memory circuit, comprising:

a memory having a plurality of locations for storing data and operable to provide a selected portion of said data from a selected one of said locations on a plurality of memory bitlines upon the receipt of an address corresponding to said selected location; and control circuitry for controlling reading and writing of data words into said memory;

said control circuitry including, an address register coupled directly to said memory for receiving and storing a first address corresponding to a first location in said memory, said address register further operable to output said first address to said memory such that first data stored in said first location is available at said memory bitlines at the start of a subsequent first read cycle;

wherein the address register is also a counter for stepping said first address in said address register to a second address corresponding to a second location in said memory at the conclusion of said first read cycle;

a bidirectional data port connected to said address register;

a holding register with sense amplifier circuitry connected to said bidirectional data port and said memory; and circuitry coupled to said memory for causing second data stored in said second location to be made available on said memory bitlines immediately in response to stepping the address register during an idle time occurring between the end of said first read cycle and the start of a second read cycle following said first read cycle.

14. The memory circuitry of claim 13, wherein said counter is operable to increment said first address.

15. The memory circuitry of claim 13, wherein said counter is operable to decrement said first address.

16. The memory circuitry of claim 13, wherein said memory comprises a random access memory.

17. A memory of claim 13 and further comprising read circuitry coupled to said memory bitlines and operable to selectively read said first data at the start of said first read cycle.

18. A color palette, comprising:

a memory having a plurality of locations for storing color data words and operable to provide a selected color data word from a selected one of said locations on a plurality of memory bitlines upon the receipt of an address corresponding to said selected location; and control circuitry for controlling reading and writing of data words into said memory;

said control circuitry including, an address register connected directly to said memory for receiving an address from an address source and for addressing a first location in said memory such that a first color data word is available from said memory during a time interval defined by a first chip enable signal in a sequence of chip enable signals;

wherein the address register is a counter for stepping said address to provide a second address for addressing a second location in said memory such that during an idle period between said first chip enable signal and a second chip enable signal a second color data word stored in said second location is immediately made available at said memory bitlines;

a bidirectional data port connected to said address register; and a holding register with sense amplifier circuitry connected to said bidirectional data port and said memory.

19. The color palette of claim 18, wherein said memory comprises a random access memory.

20. The memory of claim 19, wherein said random access memory is a 256×24 random access memory.

21. The color palette of claim 18, wherein said first and second color data each comprise 24 bit words.

22. The color palette of claim 21, wherein each said 24 bit word comprises words of red, green and blue color data.

23. The color palette of claim 22, and further comprising sense circuitry coupled to said memory bitlines and operable to selectively read said first and second color data made available at said memory bitlines.

24. The color palette of claim 18, wherein said circuitry for addressing includes a register for receiving and holding an address word.

25. A graphics processing system, comprising:

a memory for storing color data which specifies colors to be displayed on an associated video display, said memory operable to provide color data from a selected location in said memory to a plurality of memory bitlines upon the receipt of an address corresponding to said selected location;

a graphics processor operable to control the reading and writing of said color data from and to said memory locations such that said color data can be preselected; and control circuitry for controlling reading and writing of data words into said memory;

said control circuitry including, an address register coupled directly to said memory for receiving and storing a first address from said graphics processor corresponding to a first location in said memory, said address register further operable to output said first address to said memory such that first color data stored in said first location is available at bitlines of said memory before said graphics processor outputs an enable signal starting a first read cycle;

wherein the address register is a counter for stepping said first address in said address register to a second address corresponding to a second location in said memory in response to a signal from said graphics processor indicating the end of said first reading cycle;

a bidirectional data port connected to said address register; and a holding register with sense amplifier circuitry connected to said bidirectional data port and said memory;

and wherein the address register is further operable to cause said address register to output said second address to said memory such that second color data is immediately prefetched in response to stepping the address register so that the second color data is available at said bitlines of said memory prior to the start of a second reading cycle following said first reading cycle.

26. The graphics processor of claim 25, wherein said memory comprises a high-speed static RAM.

27. The graphics processing system of claim 25, wherein said color data appears at said memory bitlines in 24 bit words.

28. The graphics processor of claim 27, wherein said graphics process is further operable to read out said 24 bit words from said holding registers as a plurality of red, blue and green color words.

* * * * *